United States Patent
Shiobara et al.

(10) Patent No.: US 8,088,856 B2
(45) Date of Patent: Jan. 3, 2012

(54) HEAT-CURABLE RESIN COMPOSITION

(75) Inventors: Toshio Shiobara, Annaka (JP);
Tsutomu Kashiwagi, Annaka (JP);
Yusuke Taguchi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 97 days.

(21) Appl. No.: 12/617,919

(22) Filed: Nov. 13, 2009

(65) Prior Publication Data

US 2010/0125116 A1  May 20, 2010

(30) Foreign Application Priority Data

Nov. 14, 2008 (JP) .................... 2008-292759

(51) Int. Cl.
C08L 83/00 (2006.01)
C08K 3/22 (2006.01)
C08K 3/36 (2006.01)
C08K 3/18 (2006.01)
C08K 3/30 (2006.01)

(52) U.S. Cl. ........ 524/413; 524/588; 524/430; 524/433; 524/437; 524/420; 524/432

(58) Field of Classification Search .......... None
See application file for complete search history.

(56) References Cited

U.S. PATENT DOCUMENTS

| | | | | |
|---|---|---|---|---|
| 4,954,580 A * | 9/1990 | Zahir | ............................ | 525/476 |
| 5,863,970 A * | 1/1999 | Ghoshal et al. | ............... | 523/434 |
| 6,319,619 B1 * | 11/2001 | Yamamoto et al. | ............ | 428/620 |
| 6,916,889 B2 * | 7/2005 | Rubinsztajn et al. | ......... | 525/476 |
| 2003/0069349 A1 * | 4/2003 | Sumita et al. | .................. | 524/588 |
| 2003/0071366 A1 * | 4/2003 | Rubinsztajn et al. | ......... | 257/791 |
| 2003/0071368 A1 * | 4/2003 | Rubinsztajn | .................. | 257/793 |
| 2003/0132701 A1 | 7/2003 | Sato et al. | | |
| 2005/0008865 A1 * | 1/2005 | Rubinsztajn et al. | ......... | 428/413 |
| 2005/0049352 A1 * | 3/2005 | Rubinsztajn et al. | ......... | 524/492 |
| 2005/0282975 A1 | 12/2005 | Haitko et al. | | |
| 2005/0282976 A1 * | 12/2005 | Haitko et al. | .................. | 525/476 |
| 2006/0204760 A1 | 9/2006 | Ito | | |
| 2007/0299162 A1 | 12/2007 | Haitko | | |
| 2007/0299165 A1 * | 12/2007 | Haitko et al. | .................. | 523/459 |
| 2009/0203822 A1 | 8/2009 | Shiobara et al. | | |

FOREIGN PATENT DOCUMENTS

| | | |
|---|---|---|
| DE | 19732600 A1 | 2/1998 |
| JP | 2002-302533 A | 10/2002 |
| JP | 2004-99751 A | 4/2004 |
| JP | 2005-306952 A | 11/2005 |
| WO | WO 2007/015427 A1 | 2/2007 |

OTHER PUBLICATIONS

European Search Report for Application No. 09252607.8 dated Mar. 12, 2010.

* cited by examiner

*Primary Examiner* — Robert Loewe
(74) *Attorney, Agent, or Firm* — Birch, Stewart, Kolasch & Birch, LLP

(57) ABSTRACT

A heat-curable resin composition that yields a cured product having excellent heat resistance and light resistance, and a premolded package molded using the composition. The heat-curable resin composition comprises components (A) to (E) listed below: (A) an isocyanuric acid derivative containing at least one epoxy group within each molecule, in an amount of 100 parts by mass, (B) a silicone resin containing at least one epoxy group within each molecule, in an amount of 10 to 1,000 parts by mass, (C) an acid anhydride curing agent, in an amount such that the ratio of [total epoxy group equivalents within component (A) and component (B)/carboxyl group equivalents within component (C)] is within a range from 0.6 to 2.2, (D) a curing accelerator, in an amount within a range from 0.05 to 5 parts by mass per 100 parts by mass of the combined mass of components (A), (B) and (C), and (E) an inorganic filler, in an amount of 200 to 1,000 parts by mass per 100 parts by mass of the combined mass of components (A), (B) and (C).

10 Claims, No Drawings

HEAT-CURABLE RESIN COMPOSITION

BACKGROUND OF THE INVENTION

1. Field of the Invention

The present invention relates to a heat-curable resin composition suited to use within an optical semiconductor device, and relates more specifically to a resin composition that comprises an isocyanuric acid derivative containing an epoxy group and a silicone resin containing an epoxy group, and yields a cured product that is resistant to discoloration caused by the light and heat from an optical semiconductor, as well as an optical semiconductor device in which the cured product is used for protection or encapsulation.

2. Description of the Prior Art

Conventionally, polyphthalamide resins (PPA) are used for encapsulating optical semiconductor elements such as light emitting diodes (LED). However, recent developments have resulted in a marked increase in the output and a significant shortening of the wavelength of these optical semiconductor devices. Accordingly, optical semiconductor devices such as photocouplers that are capable of emitting or receiving light at a high output level, and particularly devices having semiconductor element-encapsulating resins or cases that use a conventional PPA resin, tend to suffer marked light degradation upon prolonged use of the device, and are prone to various problems including color irregularity of the emitted light, detachment of the encapsulating resin, and deterioration in the mechanical strength.

The use of isocyanuric acid derivative epoxy resins has been proposed as a method of addressing the problems described above (see Patent Documents 1 to 4). However, these resins are still unsatisfactory in terms of resolving the problem of discoloration.

[Patent Document 1] JP 2002-302533 A
[Patent Document 2] US 2003/0132701 A1
[Patent Document 3] JP 2005-306952 A
[Patent Document 4] WO 2007/015427
[Patent Document 5] JP 2004-99751 A

SUMMARY OF THE INVENTION

The present invention has been developed in light of the above circumstances, and has an object of providing a heat-curable resin composition which yields a cured product that retains excellent heat resistance and light resistance over long periods of time, and a premolded package for a light emitting semiconductor such as an LED or a solar cell that is molded using the composition.

As a result of intensive investigation aimed at achieving the above object, the inventors of the present invention discovered that a specific heat-curable resin composition comprising a combination of an isocyanuric acid derivative containing an epoxy group and a silicone resin containing an epoxy group exhibited excellent curability, and yielded a cured product having excellent heat resistance and light resistance as well as favorable strength, and they were therefore able to complete the present invention.

In other words, the present invention relates to a heat-curable resin composition comprising components (A) to (E) listed below.

(A) an isocyanuric acid derivative containing at least one epoxy group within each molecule, in an amount of 100 parts by mass, (B) a silicone resin containing at least one epoxy group within each molecule, in an amount of 10 to 1,000 parts by mass, (C) an acid anhydride curing agent, in an amount such that the ratio of [total epoxy group equivalents within component (A) and component (B)/carboxyl group equivalents within component (C)] is within a range from 0.6 to 2.2, (D) a curing accelerator, in an amount within a range from 0.05 to 5 parts by mass per 100 parts by mass of the combined mass of components (A), (B) and (C), and (E) an inorganic filler, in an amount of 200 to 1,000 parts by mass per 100 parts by mass of the combined mass of components (A), (B) and (C).

The resin composition of the present invention exhibits excellent curability, and yields a cured product that has favorable bending strength and is resistant to discoloration even in long-term optical element lighting tests. Accordingly, a premolded package obtained by molding the composition is particularly useful for high-brightness LED devices and solar cells.

DETAILED DESCRIPTION OF THE PREFERRED EMBODIMENTS

In the following description, "Me" represents a methyl group, "Et" represents an ethyl group, and "Ph" represents a phenyl group.

[(A) Isocyanuric Acid Derivative Containing at Least One Epoxy Group within Each Molecule]

The isocyanuric acid derivative used in the present invention is an isocyanurate ester in which at least one hydrogen atom, preferably two or more hydrogen atoms, and more preferably three hydrogen atoms, of the isocyanuric acid have been substituted with groups containing an epoxy group such as a glycidyl group. Examples of compounds that may be used as the isocyanuric acid derivative include 1,3,5-tri(2,3-epoxypropyl)isocyanurate and 1,3,5-tri($\alpha$-methylglycidyl)isocyanurate. The softening point of the isocyanuric acid derivative is preferably within a range from 90 to 125° C.

[(B) Epoxy Group-Containing Silicone Resin]

The silicone resin contains at least one epoxy group, and preferably two or more epoxy groups, per silicone resin molecule. Depending on the method used for producing the resin, such silicone resins may be classified as either (B-a) epoxy group-containing addition reaction synthetic silicone resins or (B-b) epoxy group-containing condensation reaction synthetic silicone resins. Each of these resin types is described below.

(B-a) Epoxy Group-Containing Addition Reaction Synthetic Silicone Resin

An epoxy group-containing addition reaction synthetic silicone resin can be produced by conducting an addition reaction, in the presence of a platinum catalyst, between an organohydrogenpolysiloxane having a structure corresponding with the desired target structure and an organic compound containing an epoxy group and a double bond. The organohydrogenpolysiloxane comprises at least $R^1SiO_{3/2}$ units and $R^3{}_xH_ySiO_{(4-x-y)/2}$ units (wherein $0 \leq x$, $1 \leq y$, and $x+y \leq 3$), and may further comprise $R^2{}_2SiO$ units. The groups $R^1$, $R^2$ and $R^3$ represent identical or different monovalent hydrocarbon groups of 1 to 20 carbon atoms, and x represents 0, 1 or 2, y represents 1 or 2, and x+y is either 2 or 3.

Examples of the above monovalent hydrocarbon groups of 1 to 20 carbon atoms include alkyl groups such as a methyl group, ethyl group, propyl group, butyl group, pentyl group, hexyl group or heptyl group; alkenyl groups such as a vinyl group, allyl group, butenyl group, pentenyl group or hexenyl group; aryl groups such as a phenyl group, tolyl group or xylyl group; aralkyl groups such as a benzyl group or phenethyl group; and halogen-substituted alkyl groups such as a chloromethyl group, 3-chloropropyl group, 3,3,3-trifluoropropyl group, or nonafluorobutylethyl group. Of these, monovalent hydrocarbon groups of 1 to 8 carbon atoms are preferred, a methyl group or phenyl is more preferred, and $R^2$ and $R^3$ are most preferably methyl groups, whereas $R^1$ is most preferably a phenyl group.

Examples of the abovementioned $R^3H_ySiO_{(4-x-y)/2}$ units include $R^3HSiO$ units, $R^3{}_2HSiO_{1/2}$ units, $H_2SiO$ units, and $R^3H_2SiO_{1/2}$ units. The raw materials for these units include chlorosilanes such as $Me_2HSiCl$, $MeHSiCl_2$, $Ph_2HSiCl$ and $PhHSiCl_2$, and the alkoxysilanes such as methoxysilanes that correspond with each of these chlorosilanes.

Moreover, in terms of improving the continuous moldability of the obtained composition, the organohydrogenpolysiloxane preferably includes a structure in which at least a portion of the $R^2{}_2SiO$ units are bonded in a continuous repeating sequence, and the number of units in this repeating sequence is typically within a range from 2 to 20, preferably from 2 to 15, and more preferably from 3 to 10.

This type of organohydrogenpolysiloxane can be synthesized, for example, by combining the chlorosilanes or alkoxysilanes that act as the raw materials for each of the units, in amounts that yield the molar ratio described above, and then performing a cohydrolysis in the presence of an acid.

Examples of the raw materials include trichlorosilanes such as trichlorohydrogensilane, $MeSiCl_3$, $EtSiCl_3$, $PhSiCl_3$, propyltrichlorosilane and cyclohexyltrichlorosilane; the trialkoxysilanes such as trimethoxysilanes that correspond with each of these chlorosilanes; dichlorosilanes such as dimethyldichlorosilane, methylhydrogendichlorosilane, diphenyldichlorosilane, phenylmethyldichlorosilane and methylcyclohexyldichlorosilane; dialkoxysilanes having structures that correspond with each of these dichlorosilanes; and organosiloxanes having the structures shown below.

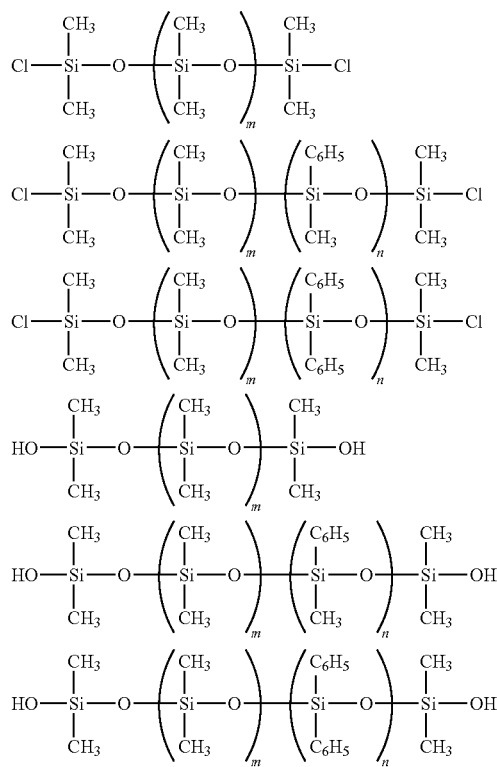

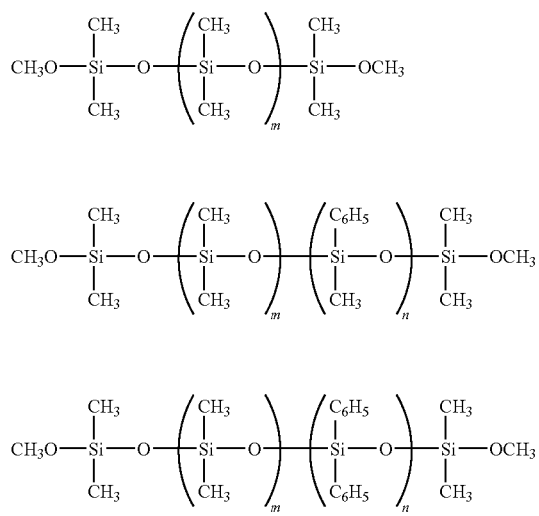

(wherein m is an integer of 0 to 18, and n is an integer of 0 to 18, provided that m+n is an integer of 0 to 18)

The organohydrogenpolysiloxane contains at least one, preferably two or more, and more preferably three or more, SiH bonds within each molecule. From the viewpoint of the properties of the cured product, the molar ratio between the $R^1SiO_{3/2}$ units, the $R^2{}_2SiO$ units, and the $R^3{}_xH_ySiO_{(4-x-y)/2}$ units is preferably within a range from 90 to 24:75 to 9:50 to 1, and is more preferably within a range from 70 to 28:70 to 20:10 to 2 (provided the total is 100).

The polystyrene referenced weight average molecular weight of the organohydrogenpolysiloxane determined by gel permeation chromatography (GPC) is typically within a range from 300 to 100,000, and is preferably from 500 to 20,000, as this ensures that the polymer is a solid or semisolid, which provides favorable levels of workability and curability.

Examples of the organohydrogenpolysiloxane include the compounds represented by the formulas shown below.

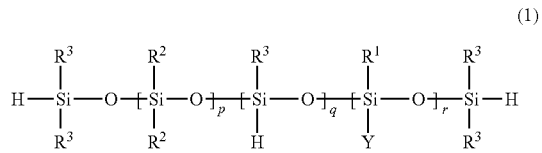
(1)

(wherein $R^1$ to $R^3$ are as defined above, Y is a group represented by a formula (2) shown below, p represents an integer of 0 to 100 and q represents an integer of 0 to 30, provided that $1 \leq p+q$, and r represents an integer of 1 to 10)

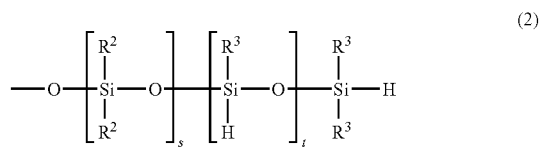
(2)

(wherein $R^2$ to $R^4$ are as defined above, s represents an integer of 0 to 30, and t represents an integer of 0 to 30).

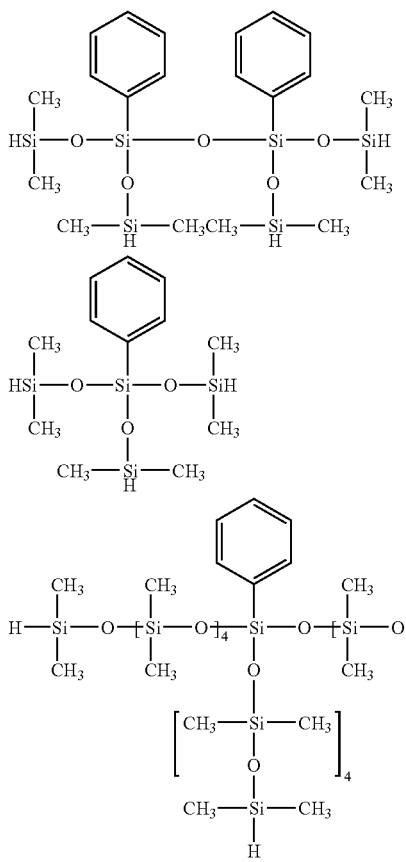

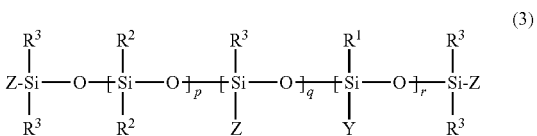

(wherein $R^1$ to $R^3$ are as defined above, Z is a 3,5-diglycidyl-isocyanurylalkyl group represented by the formula (4) shown below, Y is a group represented by a formula (5) shown below, p represents an integer of 0 to 100 and q represents an integer of 0 to 30, provided that $1 \leq p+q$, and r represents an integer of 1 to 10)

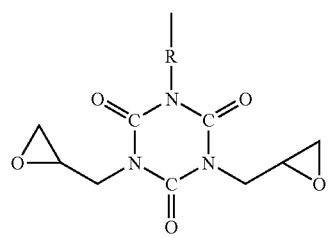

(wherein R represents an alkylene group of 2 to 12 carbon atoms)

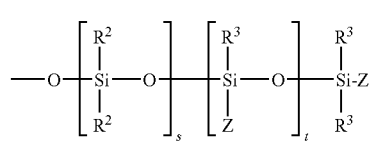

(wherein, $R^2$, $R^3$ and Z are as defined above, s represents an integer of 0 to 30, and t represents an integer of 0 to 30).

(B-b) Epoxy Group-Containing Condensation Reaction Synthetic Silicone Resin

The epoxy group-containing condensation reaction synthetic silicone resin is a resin composed of $R^4SiO_{3/2}$ units (T units), and at least one type of unit selected from amongst units represented by $R^5_2SiO_{2/2}$ units (D units), units represented by $R^6_3SiO_{1/2}$ (M units) and units represented by $SiO_{4/2}$ (Q units). The silicone resin may be represented by an average composition formula (6) shown below.

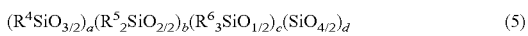

In the above formula (6), a and c each independently represents a number exceeding 0 but not more than 1, and b and d each represents a number of 0 to 1, provided that a+b+c+d=1. In a preferred configuration, b/a is a number from 0 to 10, c/a is a number from 0 to 5, and d/(a+b+c+d) is a number from 0 to 0.5. Further, from the viewpoint of the curability of the composition of the present invention, the combined total of hydroxyl groups and alkoxy groups of 1 to 6 carbon atoms preferably represents not more than 15 mol % of all the $R^4$ to $R^6$ groups.

In the above formula, $R^4$, $R^5$ and $R^6$ each independently represents a group selected from the group consisting of monovalent hydrocarbon groups of 1 to 20 carbon atoms, an epoxy group, organic groups containing an epoxy group as a portion thereof (hereafter the combination of an epoxy group and organic groups containing an epoxy group as a portion thereof is referred to using the generic term "epoxy group- An addition reaction synthetic epoxy group-containing silicone resin can be obtained by subjecting the organohydrogenpolysiloxane to an addition reaction with an organic compound containing an epoxy group and an unsaturated double bond, such as 1-allyl-3,5-diglycidylisocyanurate, allyl glycidyl ether or 1-vinyl-3,4-epoxycyclohexane. Examples of the platinum group metal-based catalyst used during the addition reaction include platinum-based, palladium-based and rhodium-based catalysts, but from the viewpoint of cost, platinum-based catalysts such as platinum, platinum black, chloroplatinic acid, platinum compounds such as $H_2PtCl_6 \cdot \alpha H_2O$, $K_2PtCl_6$, $KHPtCl_6 \cdot \alpha H_2O$, $K_2PtCl_4$, $K_2PtCl_4 \cdot \alpha H_2O$ and $PtO_2 \cdot \alpha H_2O$ (wherein α represents a positive integer), and complexes of these compounds with hydrocarbons such as olefins, alcohols, or vinyl group-containing organopolysiloxanes are preferred. These catalysts may be used either alone, or in combinations of two or more different catalysts. The blend amount of the catalyst component need only be a so-called catalytic amount, and a typical amount, calculated as the mass of the platinum group metal relative to the combined mass of the silicone resin and the organic compound containing an epoxy group and an unsaturated double bond, is within a range from 0.1 to 500 ppm, and is preferably from 0.5 to 100 ppm.

Preferred examples of the component (B-a) include organopolysiloxanes represented by a formula (3) shown below that have 3,5-diglycidylisocyanurylalkyl groups represented by a formula (4) shown below at both terminals of the main chain and on one or more side chains.

containing organic groups"), a hydroxyl group, and alkoxy groups of 1 to 6 carbon atoms, provided that at least one group per molecule is an epoxy group-containing organic group. In those cases where a portion of the $R^4$ to $R^6$ groups is one or more hydroxyl groups, alkoxy groups or a combination thereof, the silicone resin curing catalyst described below may be used to perform a condensation reaction in parallel with the epoxy resin curing reaction.

Examples of the monovalent hydrocarbon groups include alkyl groups such as a methyl group, ethyl group, propyl group, butyl group, pentyl group, hexyl group or heptyl group; alkenyl groups such as a vinyl group, allyl group, butenyl group, pentenyl group or hexenyl group; aryl groups such as a phenyl group, tolyl group or xylyl group; aralkyl groups such as a benzyl group or phenethyl group; and halogen-substituted alkyl groups such as a chloromethyl group, 3-chloropropyl group, 3,3,3-trifluoropropyl group, or nonafluorobutylethyl group. Of these, monovalent hydrocarbon groups of 1 to 8 carbon atoms are preferred, and a methyl group or phenyl group is particularly desirable.

Furthermore, examples of the epoxy group-containing organic group include epoxyalkyl groups such as an γ-glycidoxy group, 3,4-epoxybutyl group or 4,5-epoxypentyl group; epoxycyclohexylalkyl groups such as a β-(3,4-epoxycyclohexyl)ethyl group or γ-(3,4-epoxycyclohexyl)propyl group; as well as a monoglycidylisocyanuryl group or a diglycidylisocyanuryl group.

In a preferred resin, 1 to 30 mol % of all the $R^4$ to $R^6$ groups within the molecule are preferably epoxy group-containing organic groups. If the amount of epoxy group-containing organic groups is less than the lower limit of this range, then the curability of the composition of the present invention tends to be unsatisfactory. In contrast, if the amount of epoxy group-containing organic groups exceeds the upper limit of this range, then a problem arises in that it becomes difficult to regulate the viscosity of the composition.

In the condensation reaction synthetic silicone resin (B-b) represented by the above average composition formula (6), the ratio of T units represented by $R^4SiO_{3/2}$ relative to the combined total of all the siloxane units is preferably not less than 70 mol %, and is more preferably 90 mol % or greater. If the proportion of T units is less than 70 mol %, then not only do the heat resistance and ultraviolet light resistance of the cured product obtained from the resulting composition tend to deteriorate, but the coefficient of expansion also tends to increase, resulting in a deterioration in the crack resistance. The remainder of the silicone resin may be composed of M, D and Q units, although the combined total of these M, D and Q units preferably represents not more than 30 mol % of all the siloxane units.

The condensation reaction synthetic silicone resin (B-b) can be prepared using methods well known to those skilled in the art, for example by conducting a condensation of a silane containing an epoxy group-containing organic group and a hydrolyzable group, or a partial hydrolysis-condensation product thereof, in the presence of a basic catalyst, and if necessary, together with a silane that does not contain an epoxy group-containing organic group but contains a hydrolyzable group.

Examples of the above silane containing an epoxy group-containing organic group and a hydrolyzable group include epoxy group-containing alkoxysilanes such as 3-glycidoxypropyl(methyl)dimethoxysilane, 3-glycidoxypropyl(methyl)diethoxysilane, 3-glycidoxypropyl(methyl)dibutoxysilane, 2-(3,4-epoxycyclohexyl)ethyl(methyl)dimethoxysilane, 2-(3,4-epoxycyclohexyl)ethyl(phenyl)diethoxysilane, 2,3-epoxypropyl(methyl)dimethoxysilane, 2,3-epoxypropyl(phenyl)dimethoxysilane, 3-glycidoxypropyltrimethoxysilane, 3-glycidoxypropyltriethoxysilane, 3-glycidoxypropyltributoxysilane, 2-(3,4-epoxycyclohexyl)ethyltrimethoxysilane, epoxycyclohexyl)ethyltriethoxysilane, 2,3-epoxypropyltrimethoxysilane, and 2,3-epoxypropyltriethoxysilane. Of these, 3-glycidoxypropyltrimethoxysilane and 2-(3,4-epoxycyclohexyl)ethyltriethoxysilane are preferred.

The condensation reaction synthetic silicone resin (B-b) may be prepared solely from the aforementioned silane containing an epoxy group-containing organic group and a hydrolyzable group, such as a resin prepared solely from glycidoxypropyltrimethoxysilane, although depending on the desired final structure, may also be prepared via a co-condensation with a silane that does not contain an epoxy group-containing organic group but contains a hydrolyzable group, such as phenyltrimethoxysilane or dimethyldimethoxysilane.

Furthermore, organopolysiloxanes of the structures shown below, in which both terminals are blocked with hydroxyl groups, may also be used as raw materials for introducing an epoxy group via a condensation reaction.

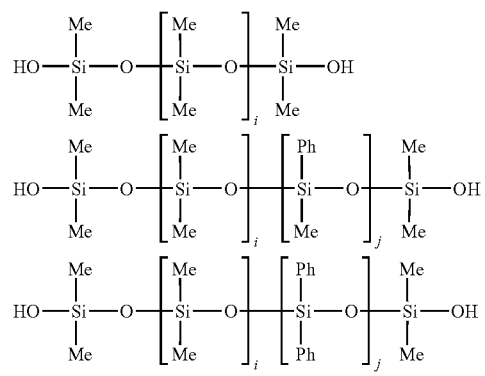

(wherein i is an integer of 0 to 150, and j is an integer of 0 to 100, provided that i+j is an integer of 0 to 150)

By subjecting glycidoxypropyltrimethoxysilane or β-(3,4-epoxycyclohexyl)ethyltrimethoxysilane to hydrolysis and condensation together with an aforementioned organopolysiloxane in which both terminals are blocked with hydroxyl groups, an organopolysiloxane having an epoxy group at both terminals is obtained.

The condensation reaction may be conducted using conventional methods, and is preferably conducted in the presence of either an acid catalyst such as acetic acid, hydrochloric acid or sulfuric acid, or an alkali catalyst such as sodium hydroxide, potassium hydroxide or tetramethylammonium hydroxide. For example, if a silane containing a silicon atom-bonded chlorine atom as the hydrolyzable groups is used, then the hydrochloric acid produced by adding water acts as a catalyst, and a hydrolysis-condensation product having a targeted molecular weight can be obtained.

The amount of water added during the condensation reaction in the case where the hydrolyzable group within the hydrolyzable group-containing silane compound is a silicon atom-bonded chlorine atom is typically within a range from 0.9 to 1.6 mols, and preferably from 1.0 to 1.3 mols, per 1 mol of the silicon atom-bonded chlorine atoms. Provided the amount of water added satisfies this range from 0.9 to 1.6 mols, the composition described below exhibits superior workability, and the cured product of the composition exhibits excellent toughness.

The condensation reaction is typically conducted within an organic solvent such as an alcohol, ketone, ester, cellosolve or aromatic compound. The solvent is preferably an alcohol such as methanol, ethanol, isopropyl alcohol, isobutyl alcohol, n-butanol or 2-butanol, and in terms of achieving superior curability for the composition and excellent toughness for the cured product, isopropyl alcohol is particularly desirable.

The reaction temperature for the condensation reaction is preferably within a range from 10 to 120° C., and is more preferably from 20 to 100° C. Provided the reaction temperature satisfies this range, gelling is prevented, and a solid hydrolysis-condensation product is obtained that can be used favorably in the next step.

The condensation reaction synthetic silicone (B-b) obtained in this manner is either a solid or a liquid, and in the case of a solid, has a melting point that is preferably within a range from 50 to 100° C., and more preferably from 70 to 80° C. If the melting point is less than 50° C. or greater than 100° C., then mixing and kneading of the silicone resin with the other components may become difficult. In the case of a liquid, the viscosity at 25° C. is preferably within a range from 1,000 to 5,000,000 mPa·s, and is more preferably from 2,000 to 2,000,000 mPa·s. Furthermore, the polystyrene referenced weight average molecular weight of the condensation reaction synthetic silicone resin (B-b) is preferably within a range from 500 to 100,000, and is more preferably from 800 to 30,000.

[(C) Acid Anhydride Curing Agent]

In order to impart favorable light resistance, the acid anhydride curing agent is preferably non-aromatic, and preferably contains no carbon-carbon double bonds. Specific examples of the acid anhydride curing agent include hexahydrophthalic anhydride and alkyl substituted derivatives thereof such as methylhexahydrophthalic anhydride, trialkyltetrahydrophthalic anhydrides, and hydrogenated methylnadic anhydride. Of these, methylhexahydrophthalic anhydride is preferred. Any of these acid anhydride curing agents may be used individually, or two or more different acid anhydrides may be used in combination.

The blend amount of the acid anhydride curing agent is such that a combined amount of epoxy groups within the component (A) and the component (B) is within a range from 0.6 to 2.2 equivalents, preferably from 1.0 to 2.0 equivalents, and more preferably from 1.2 to 1.6 equivalents, per carboxyl group equivalent within the acid anhydride described above. At a value less than the lower limit of the above range, the polymerization degree of the prepolymer may not increase sufficiently, which can cause a deterioration in the reactivity of the resin composition of the present invention. In contrast, if the value exceeds the upper limit of the above range, then depending on the reaction conditions, the viscosity may increase unfavorably, and gelling may occur in some cases. In this description, a "carboxyl group" within the acid anhydride of the component (C) is assumed to describe the carboxylic acid prior to anhydridization. In other words, 1 mol of acid anhydride groups corresponds with two carboxyl group equivalents.

[(D) Curing Accelerator]

In the resin composition of the present invention, examples of the curing accelerator (D) used in the reaction between the epoxy group-containing components (A) and (B), and the acid anhydride curing agent (C) include any of the known compounds conventionally used as curing accelerators for epoxy resin compositions. Specific examples include one or more compounds selected from amongst tertiary amines, imidazoles, organic carboxylate salts of tertiary amines or imidazoles, metal organic carboxylates, metal-organic chelate compounds, aromatic sulfonium salts, phosphorus-based curing catalysts such as organic phosphine compounds and phosphonium compounds, and salts of these phosphorus-based curing catalysts. Of the above compounds, imidazoles and phosphorus-based curing catalysts are preferred, and specific examples include 2-ethyl-4-methylimidazole, methyltributylphosphonium dimethylphosphate, and quaternary phosphonium bromide.

The amount used of the curing accelerator is typically within a range from 0.05 to 5 parts by mass, and preferably from 0.1 to 2 parts by mass, per 100 parts by mass of the combined mass of components (A), (B) and (C). If the amount is outside this range, then the balance between the heat resistance and the humidity resistance may deteriorate for the cured product obtained from the resin composition of the present invention.

[(E) Inorganic Filler]

Examples of inorganic fillers that may be blended into the resin composition of the present invention include the types of inorganic fillers typically used within conventional epoxy resin compositions and silicone resin compositions. Specific examples of the inorganic filler include silica fillers such as fused silica and crystalline silica, alumina, magnesium oxide, aluminum hydroxide, titanium oxide, silicon nitride, aluminum nitride and boron nitride, as well as fibrous fillers such as glass fiber and wollastonite, and antimony trioxide. These inorganic fillers may be used either alone, or in combinations of two or more different fillers. There are no particular limitations on the average particle size or the shape of the inorganic filler particles. However, in those cases where a premolded package having a narrow portion is to be molded, the use of an inorganic filler having an average particle size not larger than ½ of the thickness of the narrow portion is desirable.

Fused silica and fused spherical silica are particularly desirable, and from the viewpoints of moldability and flowability, the average particle size is preferably within a range from 4 to 40 μm, and more preferably from 7 to 35 μm. Further, the flowability of the composition can be enhanced by using a combination of particles in an ultra fine particle range of 3 μm or less, particles in a midsize particle range of 4 to 8 μm, and particles in a coarse particle range of 10 to 40 μm. In those cases where a premolded package having a narrow portion is to be molded, or in those cases where the composition is to be used as an underfill material, the use of an inorganic filler having an average particle size not larger than ½ of the thickness of the narrow portion is desirable.

The use of a so-called white pigment as the inorganic filler, which is a white-colored filler having a small particle size such as titanium dioxide, potassium titanate, zirconium oxide, zinc sulfide, zinc oxide and magnesium oxide, and preferably titanium oxide, is ideal when the composition is used as a reflector for the optical element of an LED device.

The unit cell for the titanium dioxide may be either rutile or anatase. Furthermore, although there are no particular restrictions on the average particle size or shape of the titanium dioxide particles, a fine powder is preferred in terms of achieving good enhancement of the whiteness with a small amount of material. In order to improve the compatibility with the resin and inorganic filler, and improve the dispersibility and the light resistance, the titanium dioxide is preferably a rutile titanium dioxide that has undergone a preliminary surface treatment with a water-containing oxide of Al or Si or the like or a silane.

The average particle size of the white pigment is typically within a range from 0.05 to 5.0 μm, and preferably at least 0.05 μm but less than 4 μm. The average particle size can be determined as the mass average value $D_{50}$ (or the median size) within a particle size distribution measurement conducted using a laser diffraction technique.

The blend amount of the inorganic filler (E) is typically within a range from 200 to 1,000 parts by mass, and preferably from 500 to 1,000 parts by mass, per 100 parts by mass of the combination of component (A), component (B) and component (C). If this amount is less than the lower limit of the above range, then adequate strength may be unobtainable, whereas if the amount exceeds the upper limit, then thickening of the composition may cause incomplete encapsulation defects and the loss in flexibility may cause defects such as detachment to occur inside the element.

The blend amount of the white pigment described above is preferably within a range from 5 to 50% by mass, more preferably from 10 to 40% by mass, and still more preferably from 15 to 30% by mass, relative to the combined mass of the components (A), (B), (C), (D) and (E). If this amount is less than the lower limit of the above range, then a satisfactory level of whiteness may be unobtainable, whereas if the amount exceeds the upper limit, then the flowability of the composition may deteriorate and moldability problems may arise, causing incomplete encapsulation or voids or the like.

In order to improve the bonding strength between the resin and the inorganic filler, the inorganic filler may be subjected to a preliminary surface treatment with a coupling agent such as a silane coupling agent or a titanate coupling agent.

Specific examples of preferred coupling agents include epoxy functional group-containing alkoxysilanes such as γ-glycidoxypropyltrimethoxysilane, γ-glycidoxypropylmethyldiethoxysilane and β-(3,4-epoxycyclohexyl)ethyltrimethoxysilane, amino functional group-containing alkoxysilanes such as N-(β-aminoethyl)-γ-aminopropyltrimethoxysilane, γ-aminopropyltriethoxysilane and N-phenyl-γ-aminopropyltrimethoxysilane, and mercapto functional group-containing alkoxysilanes such as γ-mercaptopropyltrimethoxysilane. There are no particular restrictions on the blend amount of the coupling agent used in the surface treatment, nor on the surface treatment method employed.

[(F) Antioxidant]

An antioxidant may be added to the resin composition of the present invention as required. Examples of antioxidants that may be used include phenol-based, phosphorus-based and sulfur-based antioxidants. Specific examples of these antioxidants are listed below.

Examples of phenol-based antioxidants include 2,6-di-t-butyl-p-cresol, butylated hydroxyanisole, 2,6-di-t-butyl-p-ethylphenol, stearyl-β-(3,5-di-t-butyl-4-hydroxyphenyl)propionate, 2,2'-methylenebis(4-methyl-6-t-butylphenol), 4,4'-butylidene-bis(3-methyl-6-t-butylphenol), 3,9-bis[1,1-dimethyl-2-{β-(3-t-butyl-4-hydroxy-5-methylphenyl)propionyloxy}ethyl]-2,4,8,10-tetraoxaspiro[5,5]-undecane, 1,1,3-tris(2-methyl-4-hydroxy-5-t-butylphenyl)butane, and 1,3,5-trimethyl-2,4,6-tris(3,5-di-t-butyl-4-hydroxybenzyl) benzene. Of these, 2,6-di-t-butyl-p-cresol is preferred.

Examples of phosphorus-based antioxidants include triphenyl phosphite, diphenylalkyl phosphites, phenyldialkyl phosphites, tri(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, di(2,4-di-tert-butylphenyl)pentaerythritol diphosphite, tristcaryl sorbitol triphosphite, and tetrakis(2,4-di-tert-butylphenyl)-4,4'-biphenyl diphosphonate. Of these, triphenyl phosphite is preferred.

Examples of sulfur-based antioxidants include dilauryl-3, 3'-thiodipropionate, dimyristyl-3,3'-thiodipropionate, and distearyl-3,3'-thiodipropionate.

Any of these antioxidants may be used alone, or a combination of two or more different antioxidants may be used. The use of either a single phosphorus-based antioxidant or a combination of a phenol-based antioxidant and a phosphorus-based antioxidant is preferred. When a mixture of a phenol-based antioxidant and a phosphorus-based antioxidant is used, the mass ratio between the two antioxidants preferably satisfies [phenol-based antioxidant:phosphorus-based antioxidant]=0:100 to 70:30, and more preferably 0:100 to 50:50.

The blend amount of the antioxidant is typically within a range from 0.01 to 10 parts by mass, and preferably from 0.03 to 5 parts by mass, per 100 parts by mass of the combination of component (A), component (B) and component (C). If the blend amount of the antioxidant is less than the lower limit of the above range, then preventing discoloration may be impossible, whereas if the amount exceeds the upper limit, curing of the composition may be inhibited.

[Other Additives]

Various other additives may also be added to the heat-curable resin composition of the present invention according to need. For example, stress reduction agents such as thermoplastic resins, thermoplastic elastomers, organic synthetic rubbers and silicones, as well as other additives such as waxes, silane-based coupling agents, titanium-based coupling agents, and halogen trapping agents may be added to the composition in order to improve specific properties of the resin, provided the addition of these additives does not impair the effects of the present invention. Moreover, in those cases where the composition of the present invention is used as a semiconductor-encapsulating material or for the encapsulation of any of a variety of vehicle-mounted modules, carbon black or the like may be used as a colorant. A high-purity carbon black containing minimal amounts of alkali metals and halogens is preferred.

Furthermore, in those cases where the composition comprises a condensation reaction synthetic silicone resin (B-b), a silicone resin curing catalyst described below may be added so that the condensation reaction proceeds in parallel with the curing of the composition. Examples of the silicone resin curing catalyst include basic compounds such as trimethylbenzylammonium hydroxide, tetramethylammonium hydroxide, n-hexylamine, tributylamine, diazabicycloundecene (DBU) and dicyandiamide; metal-containing compounds such as tetraisopropyl titanate, tetrabutyl titanate, titanium acetylacetonate, aluminum triisobutoxide, aluminum triisopropoxide, aluminum tris(acetylacetonate), aluminum bis(ethylacetoacetate)-mono(acetylacetonate), zirconium tetra(acetylacetonate), zirconium tetrabutyrate, cobalt octylate, cobalt acetylacetonate, iron acetylacetonate, tin acetylacetonate, dibutyltin octylate, dibutyltin laurate, zinc octylate, zinc benzoate, zinc p-tert-butylbenzoate, zinc laurate, zinc stearate; and organotitanium chelate compounds such as diisopropoxybis(ethylacetoacetate)titanium. Of these, zinc octylate, zinc benzoate, zinc p-tert-butylbenzoate, zinc laurate, zinc stearate, aluminum triisopropoxide and organotitanium chelate compounds are preferred. Zinc benzoate and organotitanium chelate compounds are particularly preferred. The blend amount of the curing catalyst is preferably within a range from 0.01 to 10.0 parts by mass, and more preferably from 0.1 to 6.0 parts by mass, per 100 parts by mass of the combination of the components (A) to (C).

Furthermore, if required, a resin containing an epoxy group other than the components (A) and (B) may be used in combination with the components (A) and (B), provided this does not impair the effects of the present invention. Examples of this other epoxy resin include biphenol-type epoxy resins such as bisphenol A epoxy resins, bisphenol F epoxy resins, 3,3',5,5'-tetramethyl-4,4'-biphenol epoxy resins and 4,4'-biphenol epoxy resins, phenol novolak epoxy resins, cresol novolak epoxy resins, bisphenol A novolak epoxy resins, naphthalenediol epoxy resins, trisphenylolmethane epoxy resins, tetrakisphenylolethane epoxy resins, and epoxy resins obtained by hydrogenation of the aromatic rings of phenol dicyclopentadiene novolak epoxy resins. The softening point of this other epoxy resin is preferably within a range from 70 to 100° C.

The composition of the present invention can be prepared by blending together predetermined amounts of the aforementioned components (A) to (E), together with any of the other components that may be added as required, thoroughly mixing the components using a mixer or the like to achieve a uniform composition, conducting a molten mixing treatment using heated rollers, a kneader and/or an extruder or the like, subsequently cooling and solidifying the composition, and then crushing the product to an appropriate particle size to obtain a molding material of the resin composition.

Alternatively, the composition may be prepared by blending together the component (A), the component (B) and the component (C), reacting the resulting mixture under predetermined conditions, preferably in the presence of an antioxidant and/or a curing catalyst, so that the component (A) loses flowability to generate a semi-cured state, thus forming a prepolymer, and then subsequently adding the other components. Reaction products that are solid at room temperature are preferred for reasons such as workability, and therefore the equivalence ratio of [total epoxy groups within component (A) and component (B)]/[carboxyl groups within component (C)] is preferably within a range from 0.6 to 2.2.

When preparing a prepolymer, either the component (A) and/or the component (B), the component (C), and preferably the component (F) are reacted in advance at a temperature of 70 to 120° C., and preferably 80 to 110° C., for a period of 4 to 20 hours, and preferably 6 to 15 hours, or the component (A) and/or the component (B), the component (C) and the component (D) are reacted in advance at a temperature of 30 to 80° C., and preferably 40 to 60° C., for a period of 10 to 72 hours, and preferably 36 to 60 hours. The reaction product is preferably a solid having a softening point of 50 to 100° C., and more preferably 60 to 90° C., as such products can be readily pelletized. If this softening point is less than 50° C., then the product tends not to be solid, whereas if the softening point exceeds 100° C., the flowability may deteriorate. Those components not added during preparation of the prepolymer can be added to, and mixed with, the prepolymer to complete preparation of the composition.

The resin composition of the present invention exhibits excellent moldability, and forms a cured product that exhibits excellent heat resistance and light resistance, and particularly ultraviolet light resistance, and can therefore be used favorably in all manner of optical semiconductor devices. The composition is particularly ideal for producing premolded packages for white LEDs, blue LEDs and ultraviolet LEDs, and also as a packaging material for solar cells. A premolded package describes a device comprising a matrix array-type metal substrate or organic substrate having lead portions or pad portions formed thereon, which has been subjected to resin encapsulation so that only the optical element-mounting portion and lead connectors remain exposed. In addition, the composition of the present invention may also be used as a typical semiconductor encapsulation material or underfill material, or as an encapsulation material for all manner of vehicle-mounted modules and the like.

An example of the method used for performing encapsulation molding using the resin composition of the present invention is low-pressure transfer molding. With this method, the molding conditions preferably include a molding temperature of 150 to 185° C. and a molding time of 30 to 180 seconds. Following the encapsulation, post-curing may be performed at 150 to 185° C. for a period of 2 to 20 hours.

The reflectance of the resulting cured product relative to light of wavelength 380 to 750 nm preferably has an initial value of at least 70%, and following a degradation test at 180° C. for 24 hours, preferably still has a reflectance of at least 70%. If this reflectance is less than 70%, then when the cured product is used as a semiconductor element case for an LED, the brightness tends to deteriorate, and the required level of performance may be unachievable. The method used for measuring the reflectance is descried below.

EXAMPLES

A more detailed description of the present invention is presented below using a series of examples and comparative examples, although the present invention is in no way limited by the examples described below.

Compositions were prepared using the formulations (units: parts by mass) shown in Tables 1 and 2. The components listed in these tables are detailed below.

(A) Epoxy Group-Containing Isocyanuric Acid Derivative: tris(2,3-epoxypropyl)isocyanurate (TEPIC-S, a Product Name, Manufactured by Nissan Chemical Industries, Ltd., Epoxy Equivalent Weight: 100)

(B) Silicone Resin Containing at Least One Epoxy Group within Each Molecule: Silicone Resins B-1 to B-5 Synthesized Via the Production Examples Detailed Below.

Production Example 1

A flask was charged with 900 g of isopropyl alcohol, 13 g of a 25% by mass aqueous solution of tetramethylammonium hydroxide and 91 g of water, 255 g of γ-glycidoxypropyltrimethoxysilane (KBM403, manufactured by Shin-Etsu Chemical Co., Ltd.) was added, and the resulting mixture was stirred at room temperature for 20 hours.

Following completion of the reaction, 1,200 g of toluene was added to the reaction mixture, and the isopropyl alcohol and the like was removed under reduced pressure. The residue was then washed with hot water using a dropping funnel. Washing was continued until the water layer was neutral, and the toluene layer was then dried over anhydrous sodium sulfate. The anhydrous sodium sulfate was removed by filtration, and the toluene was then removed under reduced pressure, yielding the target resin (silicone resin B-1). The epoxy equivalent weight was 185 g/mol.

Production Example 2

A 0.5 liter separable flask was charged with 157.0 g (0.56 mols) of 1-allyl-3,5-diglycidylisocyanurate and 71.7 g (0.14 mols) of a hydrogensiloxane represented by an average molecular formula shown below,

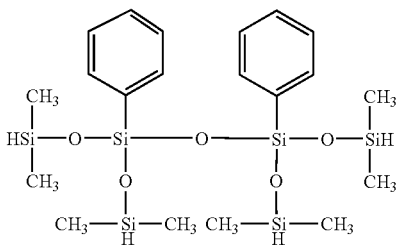

a 2% by mass octyl alcohol solution of chloroplatinic acid (Pt amount: 20 ppm) was added, and the mixture was reacted at 80 to 100° C. for 6 hours. Subsequently, the unreacted raw materials were removed by distillation under reduced pressure, yielding 224 g of a colorless and transparent liquid (silicone resin B-2). The yield was 91%. The epoxy equivalent weight of the colorless and transparent liquid was 201 g/mol.

Production Example 3

A 0.5 liter separable flask was charged with 72.9 g (0.26 mols) of 1-allyl-3,5-diglycidylisocyanurate and 70.7 g (0.14 mols) of a hydrogensiloxane represented by an average molecular formula shown below,

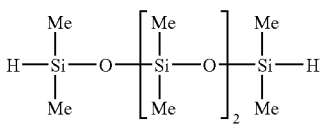

a 2% by mass octyl alcohol solution of chloroplatinic acid (Pt amount: 20 ppm) was added, and the mixture was reacted at 80 to 100° C. for 6 hours. Subsequently, the unreacted raw materials were removed by distillation under reduced pressure, yielding 132 g of a colorless and transparent liquid (silicone resin B-3). The yield was 92%. The epoxy equivalent weight of the colorless and transparent liquid was 133 g/mol.

Production Example 4

A 0.5 liter separable flask was charged with 84.4 g (0.30 mols) of 1-allyl-3,5-diglycidylisocyanurate and 31.6 g (0.1 mols) of a hydrogensiloxane represented by an average molecular formula shown below,

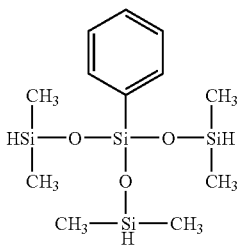

a 2% by mass octyl alcohol solution of chloroplatinic acid (Pt amount: 20 ppm) was added, and the mixture was reacted at 80 to 100° C. for 6 hours. Subsequently, the unreacted raw materials were removed by distillation under reduced pressure, yielding 110 g of a colorless and transparent liquid (silicone resin B-4). The yield was 95%. The epoxy equivalent weight of the colorless and transparent liquid was 196 g/mol.

Production Example 5

A 0.5 liter separable flask was charged with 84.4 g (0.30 mols) of 1-allyl-3,5-diglycidylisocyanurate and 117 g (0.1 mols) of a hydrogensiloxane represented by an average molecular formula shown below,

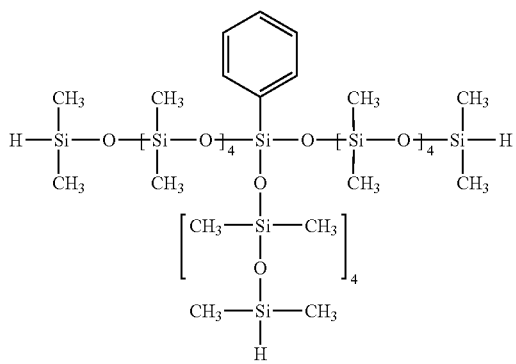

a 2% by mass octyl alcohol solution of chloroplatinic acid (Pt amount: 20 ppm) was added, and the mixture was reacted at 80 to 100° C. for 6 hours. Subsequently, the unreacted raw materials were removed by distillation under reduced pressure, yielding 187 g of a colorless and transparent liquid (silicone resin B-5). The yield was 93%. The epoxy equivalent weight of the colorless and transparent liquid was 344 g/mol.

(C) Acid Anhydride Curing Agent

Methylhexahydrophthalic anhydride (RIKACID MB, a product name, manufactured by New Japan Chemical Co., Ltd.)

(D) Curing Accelerator

Methyltributylphosphonium dimethylphosphate (PX-4 MP, a product name, manufactured by Nippon Chemical Industrial Co., Ltd.)

2-ethyl-4-methylimidazole (2E4MZ, a product name, manufactured by Shikoku Corporation)

(E) Inorganic Filler

Titanium dioxide: rutile form, average particle size: 0.29 μm (R-45M, manufactured by Sakai Chemical Industry Co., Ltd.)

Fused silica: average particle size: 45 μm (MSR-4500TN, manufactured by Tatsumori Ltd.)

Alumina. (DAW45, manufactured by Denki Kagaku Kogyo Kabushiki Kaisha)

(F) Antioxidant: Triphenyl Phosphite (Manufactured by Wako Pure Chemical Industries, Ltd.)

Other Additives

Silane coupling agent: 3-mercaptopropyltrimethoxysilane (KBM803, manufactured by Shin-Etsu Chemical Co., Ltd.)

Release agent: calcium stearate (manufactured by Wako Pure Chemical Industries, Ltd.)

Examples 1 to 8

Comparative examples 1 and 2

Preparation of Compositions

In each example, the components were blended together in the amounts (parts by mass) detailed in Table 1, and a prepolymer was then prepared by heating under the conditions listed in Table 1. Subsequently, using the formulations detailed in Table 2 (blend units: parts by mass), each of the components and prepolymers were mixed together in a mixer, forming a series of compositions.

TABLE 1

| Component | | Prepolymer (1) | (2) | (3) | (4) | (5) | (6) | (7) | (8) | (9) |
|---|---|---|---|---|---|---|---|---|---|---|
| (A) Epoxy group-containing isocyanuric acid derivative | | 8 | 25 | 50 | 50 | 30 | 10 | 20 | | 45 |
| (B) Epoxy group-containing silicone resin | B-1 | 59.2 | | | | | | | 20 | |
| | B-2 | | 38.8 | 6.3 | 16.5 | | | | | |
| | B-3 | | | | | 28 | | | 44 | |
| | B-4 | | | | | | 49.9 | | | |
| | B-5 | | | | | | | 42.7 | | |
| (C) Acid anhydride curing agent | | 32.8 | 36.2 | 43.7 | 33.5 | 41.9 | 40.1 | 37.2 | 36 | 55 |
| (F) Antioxidant | | | 3 | 3 | 2 | | | | | 3 |
| (D) Curing accelerator (2E4MZ) | | | | | | 1 | | | 1 | |
| [epoxy groups in (A) + (B)]/ carboxyl groups in (C) (equivalence ratio) | | 1.4 | 1.4 | 1.4 | 2 | 1.4 | 1.5 | 1.5 | 1.3 | 1.4 |
| Reaction conditions | | 80° C. 10 hr | 80° C. 10 hr | 80° C. 10 hr | 80° C. 10 hr | 40° C. 30 hr | 80° C. 10 hr | 80° C. 10 hr | 40° C. 30 hr | 80° C. 10 hr |

Each of the obtained compositions was measured for the properties described below. The results are shown in Table 2.

<<Spiral Flow Value>>

Using a molding die prescribed in the EMMI standards, the spiral flow value was measured under conditions including 175° C., 6.9 N/mm², and a molding time of 120 seconds.

<<Melt Viscosity>>

Using a Koka-type flow tester and a nozzle with a diameter of 1 mm, the viscosity at a temperature of 175° C. was measured under a pressure of 25 kgf.

<<Bending Strength>>

The prepolymer was mixed with the curing catalyst and the filler listed in Table 2 to prepare a composition, and a molding die prescribed in the EMMI standards was then used to measure the bending strength under conditions including 175° C., 6.9 N/mm², and a molding time of 120 seconds.

<<Resistance to Heat Discoloratione>>

A circular disc having a diameter of 50 mm and a thickness of 3 mm was molded from each of the prepared compositions under conditions including 175° C., 6.9 N/mm² and a molding time of 2 minutes, and following standing for 24 hours at 180° C., the resistance to heat discoloration was evaluated using the criteria listed below.

A: colorless and transparent
B: No discoloration
C: Slight discoloration
D: Discoloration
E: Severe discoloration <<Ultraviolet Light Resistance>>

A circular disc having a diameter of 50 mm and a thickness of 3 mm was molded from each of the prepared compositions under conditions including 175° C., 6.9 N/mm² and a molding time of 2 minutes, and the resulting circular disc was irradiated with ultraviolet light having a wavelength of 405 nm for 24 hours in an atmosphere at a temperature of 120° C. The external appearance of the circular disc was inspected visually before and after the irradiation, the level of discoloration was noted, and the ultraviolet light resistance of the disc surface was evaluated using the criteria listed below.

A: No discoloration
B: Slight discoloration
C: Discoloration
D: Severe discoloration

TABLE 2

| Component | | | Example 1 | 2 | 3 | 4 | 5 | 6 | 7 | 8 | Comparative example 1 | 2 |
|---|---|---|---|---|---|---|---|---|---|---|---|---|
| (A) Epoxy group-containing isocyanuric acid derivative | | | | | | | | | | 22.5 | | |
| (C) Acid anhydride curing agent | | | | | | | | | | 27.5 | | |
| Prepolymer | (1) | | 100 | | | | | | | | | 100 |
| | (2) | | | 100 | | | | | | 50 | | |
| | (3) | | | | 100 | | | | | | | |
| | (4) | | | | | 100 | | | | | | |
| | (5) | | | | | | 100 | | | | | |
| | (6) | | | | | | | 100 | | | | |
| | (7) | | | | | | | | 100 | | | |
| | (8) | | | | | | | | | | 100 | |
| | (9) | | | | | | | | | | | 100 |
| Silicone content within organic resin (%) | | | 59 | 39 | 6 | 17 | 28 | 50 | 43 | 32 | 100 | |
| (D) Curing accelerator | PX-4MP | | 1 | | 1 | 1 | 1 | 1 | 1 | 1 | 1 | |
| | 2E4MZ | | | 1 | | | | | | | | 1 |
| (E) inorganic filler | Titanium dioxide | | 160 | 150 | 120 | 160 | 120 | 160 | 160 | 120 | 160 | 160 |
| | Fused silica | | 540 | 650 | 540 | | 540 | 500 | 500 | 540 | 540 | 540 |
| | Alumina | | | | | 790 | | | | | | |

TABLE 2-continued

| Component | | Example | | | | | | | | Comparative example | |
|---|---|---|---|---|---|---|---|---|---|---|---|
| | | 1 | 2 | 3 | 4 | 5 | 6 | 7 | 8 | 1 | 2 |
| Other additives | Silane coupling agent | 1 | 1 | 1 | 1 | 1 | 1 | 1 | 1 | 1 | 1 |
| | Release agent | 1 | 1 | 1 | 1 | 1 | 1 | 1 | 1 | 1 | 1 |
| Spiral flow | inch | 23 | 21 | 19 | 19 | 25 | 19 | 18 | 27 | 22 | 25 |
| Melt viscosity | Pa·s | 117 | 100 | 125 | 178 | 130 | 150 | 180 | 90 | 108 | 95 |
| Bending strength | N/mm$^2$ | 93 | 106 | 100 | 80 | 95 | 83 | 90 | 105 | 45 | 100 |
| Heat discoloration resistance | 180° C. × 24 hr | A | B | D | C | B | A | A | B | A | E |
| Ultraviolet light resistance | 120° C. × 24 hr | A | A | C | B | A | A | A | A | A | D |

Example 9

Each of the resin compositions for examples 1, 2, 4, 6 and 7 was subjected to transfer molding under the conditions described below so as to encapsulate a totally silver-plated copper lead frame. This method was used to prepare twenty top view type premolded packages from each composition.

Molding temperature: 170° C.
Molding pressure: 70 kg/cm$^2$
Molding time: 3 minutes Following the molding and encapsulation, the resin composition was subjected to post-curing at 170° C. for 2 hours. When the adhesion between the leads and the resin in the molded package was measured using the red ink test described below, no ink bleeding was observed, and the adhesion was favorable. Furthermore, the light reflectance was measured using the method described below, and for each package molded using one of the above compositions, the light reflectance was 92% or greater.

Red Ink Test

A red ink was injected into the cavity in the premolded package, the package was left to stand for one hour, and the external lead portions of the package were then inspected visually for the existence of ink bleeding.

Light Reflectance

A circular disc-shaped cured product having a diameter of 50 mm and a thickness of 3 mm was prepared by molding and curing the composition under conditions including 175° C., 6.9 N/mm$^2$, and a molding time of 120 seconds. Immediately following molding and curing, the cured product was subjected to UV irradiation for 24 hours using a high-pressure mercury lamp (peak wavelength: 365 nm, 60 mW/cm), and the light reflectance of the circular disc-shaped cured product at a wavelength of 450 nm was then measured using a bench-top spectrophotometric colorimeter (product name: X-rite 8200, manufactured by SDG K.K.).

Five blue LED devices were assembled using each of the prepared premolded packages. The LED element was bonded to a die pad on the premolded package with a silicone die bonding material (product name. LPS8433, manufactured by Shin-Etsu Chemical Co., Ltd.) disposed therebetween, and the silicone die bonding material was then cured by heating at 150° C. for one hour. The lead portions and the element were then connected using gold wiring. Subsequently, the LED element was covered with a silicone encapsulating material (LPS3419, manufactured by Shin-Etsu Chemical Co., Ltd.), and curing was then performed at 120° C. for one hour, and then 150° C. for a further one hour, thus completing encapsulation of the element. For the purposes of comparison, premolded packages molded using the resin composition of comparative example 2 and premolded packages molded using a PPA resin were each used to assemble five LED devices under the same conditions as those described above.

The LED devices were left to stand for 48 hours in an atmosphere at 25° C. and a relative humidity of 80%, and were then passed three times through a reflow oven with a maximum temperature of 260° C. Subsequently, the state of the adhesion between the package surface and the encapsulating resin, and between the element surface and the encapsulating resin was investigated. The devices assembled using the packages molded from the compositions of the present invention suffered absolutely no detachment defects. In contrast, detachment faults were observed in two of the devices obtained from the composition of comparative example 2, and in four of the devices obtained from the PPA resin.

As is evident from Table 2, the cured product obtained from the comparative example 2 that lacked the epoxy group-containing silicone resin (B) suffered severe discoloration under either heat or ultraviolet light irradiation. In contrast, the cured products obtained from the compositions of the examples all exhibited minimal discoloration, and the compositions of example 6 and example 7 exhibited no discoloration whatsoever.

The composition of the present invention yields a cured product that is resistant to discoloration caused by the light or heat from an optical semiconductor, and is ideal for forming premolded packages for light emitting semiconductors and solar cells.

What is claimed is:

1. A heat-curable resin composition comprising components (A) to (E) listed below:
   (A) an isocyanuric acid derivative containing at least one epoxy group within each molecule, in an amount of 100 parts by mass,
   (B) a silicone resin obtained by condensing a glycidoxyalkyltrimethoxysilane, said silicone resin containing at least one epoxy group within each molecule, in an amount of 10 to 1,000 parts by mass,
   (C) an acid anhydride curing agent, in an amount such that a ratio of [total epoxy group equivalents within component (A) and component (B)/carboxyl group equivalents within component (C)] is within a range from 0.6 to 2.2,
   (D) a curing accelerator, in an amount within a range from 0.05 to 5 parts by mass per 100 parts by mass of a combined mass of components (A), (B) and (C), and
   (E) an inorganic filler, in an amount of 200 to 1,000 parts by mass per 100 parts by mass of a combined mass of components (A), (B) and (C).

2. The resin composition according to claim 1, wherein at least components (A), (B) and (C) are included as a prepolymer obtained by heating components (A), (B) and (C).

3. The resin composition according to claim 1, wherein component (A) is 1,3,5-tri(2,3-epoxypropyl)isocyanurate.

4. The resin composition according to claim 1, wherein component (B) is a branched silicone resin comprising a 3,5-diglycidylisocyanurylalkyl group.

5. The resin composition according to claim 1, wherein component (C) is selected from among hexahydrophthalic anhydride and derivatives thereof.

6. The resin composition according to claim 1, wherein component (E) comprises at least one filler selected from the group consisting of silica, alumina, magnesium oxide, aluminum hydroxide and titanium dioxide.

7. The resin composition according to claim 1, wherein component (E) comprises at least one filler selected from the group consisting of titanium dioxide, potassium titanate, zirconium oxide, zinc sulfide, zinc oxide and magnesium oxide, in an amount of 5 to 50% by mass relative to a combined mass of components (A), (B), (C), (D) and (E).

8. The resin composition according to claim 1, further comprising: (F) an antioxidant.

9. A premolded package prepared from a cured product of a heat-curable resin composition comprising components (A) to (E) listed below:
   (A) an isocyanuric acid derivative containing at least one epoxy group within each molecule, in an amount of 100 parts by mass,
   (B) a silicone resin obtained by condensing a glycidoxy-alkyltrimethoxysilane, said silicone resin containing at least one epoxy group within each molecule, in an amount of 10 to 1,000 parts by mass,
   (C) an acid anhydride curing agent, in an amount such that a ratio of [total epoxy group equivalents within component (A) and component (B)/carboxyl group equivalents within component (C)] is within a range from 0.6 to 2.2,
   (D) a curing accelerator, in an amount within a range from 0.05 to 5 parts by mass per 100 parts by mass of a combined mass of components (A), (B) and (C), and
   (E) an inorganic filler, in an amount of 200 to 1,000 parts by mass per 100 parts by mass of a combined mass of components (A), (B) and (C).

10. An optical semiconductor comprising a premolded package prepared from a cured product of a heat-curable resin composition comprising components (A) to (E) listed below:
   (A) an isocyanuric acid derivative containing at least one epoxy group within each molecule, in an amount of 100 parts by mass,
   (B) a silicone resin obtained by condensing a glycidoxy-alkyltrimethoxysilane, said silicone resin containing at least one epoxy group within each molecule, in an amount of 10 to 1,000 parts by mass,
   (C) an acid anhydride curing agent, in an amount such that a ratio of [total epoxy group equivalents within component (A) and component (B)/carboxyl group equivalents within component (C)] is within a range from 0.6 to 2.2,
   (D) a curing accelerator, in an amount within a range from 0.05 to 5 parts by mass per 100 parts by mass of a combined mass of components (A), (B) and (C), and
   (E) an inorganic filler, in an amount of 200 to 1,000 parts by mass per 100 parts by mass of a combined mass of components (A), (B) and (C).

* * * * *